UNITED STATES PATENT OFFICE.

JOKICHI TAKAMINE, OF NEW YORK, N. Y.

ENZYM.

991,560.    Specification of Letters Patent.    Patented May 9, 1911.

No Drawing.    Application filed January 25, 1907. Serial No. 353,972.

*To all whom it may concern:*

Be it known that I, JOKICHI TAKAMINE, a subject of the Emperor of Japan, and resident of the city, county, and State of New York, have made a certain new and useful Invention in Enzym, of which the following is a specification.

The object of the invention is to prepare and manufacture diastatic enzym in a concentrated form and which possesses the power of transforming starch into sugar for use in various industries, and in an economical and practical manner.

The invention consists substantially in the mode of operation as will be more fully hereinafter set forth and finally pointed out in the appended claims.

In my Patent No. 525,823, dated September 11, 1894, I have set forth, described and claimed a process of making diastatic enzym, wherein seed spores of mold fungi, belonging to the genus *Aspergillus*, and to the genera *Mucor* and *Pennecillium*, are propagated upon a bed consisting of the branny parts of grains, cereals or the like, employed as a nutrient medium, after such nutrient medium has been moistened with water, and either before or after having been steamed for the purpose of sterilizing the same. It is also set forth and described that after the medium sown with the seed spores has been maintained for a suitable length of time, and under proper conditions of humidity and temperature, the fungus develops and grows abundantly to the desired stage, when its growth is arrested and the diastatic enzym, which is soluble in water, is extracted from the mass. It is also described and claimed in said patent that the extract thus obtained may be used as a converting agent for converting starch into sugar, or such extract may be concentrated by being reëmployed over and over again as an extracting agent for fresh quantities of the mass on which the fungus has been grown and developed, or by evaporation, or the diastatic enzym contained and held in solution in the extract may be precipitated by adding thereto alcohol. It is also set forth in said patent that the addition of alcohol to the extract obtained as above mentioned does not effect a complete precipitation of all the diastatic enzym contained in the extract, but that some quantity of unprecipitated enzym remains in the alcohol mother liquor, thereby requiring an addition of further quantities of alcohol, to effect the complete precipitation of the enzym constituent of the liquor. However, the additional alcohol required is more expensive and of greater value than the quantity of enzym recovered by its use.

It is among the special purposes of my present invention to increase the amount of precipitation of the enzym in the first instance, when alcohol is added to the extract, thereby avoiding the necessity for subsequent treatment of the mother liquor for the recovery of any unprecipitated enzym, and also avoiding any loss or waste of enzym through failure to subject the mother liquor to such subsequent treatment.

In carrying out my present invention I employ a medium which may be of the same character as that set forth in my prior patent, above referred to, and upon which are sown the seed spores of the required or desired fungus, and which is treated under conditions of temperature and humidity in a manner similar to that set forth in said patent. From the mass obtained an extract is made by treating the same with water in the usual manner. To this extract I add, in accordance with my present invention, a suitable agent designed to operate as a carrier for carrying down the precipitate of enzym when alcohol is added to the extract. Many different chemical or other agents may be employed for accomplishing this result. I have found that calcium bi-phosphate, $Ca(H_2PO_4)_2$, which is a monocalcic phosphate and soluble in water is satisfactory for the purpose. This agent is added in the proper proportion which may vary throughout a desirable range, I have found that the monocalcic or calcium bi-phosphate, $Ca(H_2PO_4)_2$, in the proportion of about two per cent. (2%) by weight of the original extract is sufficient. To the extract to which the monocalcic or calcium bi-phosphate has been added, is then added alcohol of the proper strength, say of about ninety-five per cent. (95%) in the proportion of about three times by volume of the alcohol of the volume of extract, whereby the solution contains about seventy per cent. (70%) alcohol, and about thirty per cent. (30%) of extract. These proportions may be varied and therefore I do not desire to be limited thereto.

I have found that the use of the carrying down agent such, for instance, as monocalcic or calcium bi-phosphate as above noted, very greatly increases the yield of diastatic precipitate.

When the alcohol is added to the extract containing the enzym and the calcium bi-phosphate, both the enzym and also the calcium bi-phosphate are precipitated, but, in precipitating, the calcium bi-phosphate, carries down with it a larger percentage of diastatic enzym as a precipitate than has been possible to secure with the use of alcohol. I have found that the presence of calcium bi-phosphate in the precipitate thus obtained is not a detriment, and therefore it is not necessary to separate or eliminate this portion of the precipitate. Its presence in the enzym precipitate does not interfere to any material or appreciable extent with the diastatic property of such precipitate; it merely increases slightly the ash of the enzym. The diastatic strength of the enzym remains the same as if the calcium bi-phosphate had not been employed. In this respect the calcium bi-phosphate operates mechanically to carry down the enzym precipitate, which otherwise would have escaped precipitation, and with the result that the yield of precipitate is greatly increased as I have discovered, and as above stated.

The carrying down agent may be employed in the form of the crude commercial product, which is inexpensive, abundant and easily obtained. The commercial product of calcium bi-phosphate $Ca(H_2PO_4)_2$, contains more or less silica calcium sulfate $CaSO_4$, and possibly other minerals. The substance, however, can be used in accordance with my invention without eliminating these constituents, and without any material difference in the product or precipitate obtained. In practice, however, I prefer to use a combination of phosphoric acid $H_3PO_4$, and calcium hydroxid $Ca(HO)_2$, that is, ordinary slaked lime, in about the proportion of two molecules of the phosphoric acid to one molecule of the calcium hydroxid. The combination of these two substances produces a purer product of calcium bi-phosphate, which I prefer to use. I find that it is not necessary to first mix the phosphoric acid and calcium hydroxid, but these ingredients by a purely mathematical calculation may be added directly, and independently, to the extract instead of first combining them into calcium bi-phosphate.

The precipitate obtained as above described may be collected or recovered by decantation, filtration, evaporation, or otherwise, and dried, or it may be washed with alcohol to free it from adhering materials, or dehydrated by strong alcohol, or it may be still further purified by redissolving it in water and reprecipitating and washing with alcohol, and drying, thus repeating the process, the final product being an amorphous dry mass or powder of almost white or light yellowish brown color. It is readily soluble in water and possesses the power of transforming gelatinized starch into sugar.

Having now set forth the object and nature of my invention, and the method of carrying the same into practical operation, what I claim as new and useful and of my own invention, and desire to secure by Letters Patent is—

1. The process of making enzym, which consists in propagating a fungus upon a suitable nutrient medium under suitable conditions of temperature and humidity, then extracting the soluble constituents of the mass and dissolving a monocalcic phosphate in the extract, and finally precipitating the enzym from the extract by mechanically carrying down said enzym.

2. The process of making enzym, which consists in propagating a fungus upon a suitable nutrient medium under suitable conditions of temperature and humidity, then extracting with water the soluble constituents of the mass, then adding calcium bi-phosphate to the extract, and finally precipitating with alcohol.

3. The process of making enzym, which consists in propagating a fungus upon a suitable nutrient medium under proper conditions of temperature and humidity, then extracting with water the soluble constituents of the mass, then adding to the extract calcium bi-phosphate, then precipitating the solution with alcohol, and finally washing the precipitated solid matter, and drying the same.

4. The process of making enzym, which consists in developing a fungus upon a suitable nutrient medium under proper conditions of temperature and humidity, then extracting with water the soluble constituents of the mass, then adding to the extract phosphoric acid and calcium hydroxid, forming, when combined, calcium bi-phosphate, and finally precipitating the solid matter from the solution.

5. The process of making enzym, which consists in developing a fungus upon a suitable nutrient medium under proper conditions of humidity and temperature, then extracting with water the soluble constituents thereof, then adding to the extract phosphoric acid and calcium hydroxid, forming, when combined, calcium bi-phosphate, then precipitating with alcohol the solid matter contained in the solution, and finally washing and drying the precipitate.

In testimony whereof I have signed my name to this specification, in the presence of two subscribing witnesses, on this 21st day of January, A. D. 1907.

JOKICHI TAKAMINE.

Witnesses:
 KEIZO WOOYENAKA,
 S. E. DARBY.